United States Patent
Tran et al.

(10) Patent No.: US 7,330,964 B2
(45) Date of Patent: Feb. 12, 2008

(54) MICROPROCESSOR WITH INDEPENDENT SIMD LOOP BUFFER

(75) Inventors: Thang M. Tran, Austin, TX (US); Muralidharan S. Chinnakonda, Austin, TX (US)

(73) Assignee: Texas Instruments Incorporated, Dallas, TX (US)

(*) Notice: Subject to any disclaimer, the term of this patent is extended or adjusted under 35 U.S.C. 154(b) by 25 days.

(21) Appl. No.: 11/273,493

(22) Filed: Nov. 14, 2005

(65) Prior Publication Data

US 2007/0113058 A1 May 17, 2007

(51) Int. Cl.
*G06F 9/40* (2006.01)
(52) U.S. Cl. ...................................... 712/241
(58) Field of Classification Search ............... 712/241; 713/324
See application file for complete search history.

(56) References Cited

U.S. PATENT DOCUMENTS

| | | | |
|---|---|---|---|
| 5,504,912 A * | 4/1996 | Morinaga et al. ............ 712/34 |
| 5,524,223 A * | 6/1996 | Lazaravich et al. ......... 712/241 |
| 6,160,560 A * | 12/2000 | Keller et al. ................ 345/503 |
| 6,202,163 B1 * | 3/2001 | Gabzdyl et al. ............. 713/324 |
| 6,278,403 B1 * | 8/2001 | Peng et al. ............. 342/357.12 |
| 6,418,531 B1 * | 7/2002 | Nakahara .................... 712/241 |
| 6,829,697 B1 * | 12/2004 | Davis et al. .................. 712/21 |
| 6,950,929 B2 * | 9/2005 | Chung et al. ................ 712/241 |
| 7,079,147 B2 * | 7/2006 | Wichman et al. ........... 345/503 |
| 2003/0196072 A1 * | 10/2003 | Chinnakonda et al. ........ 712/32 |
| 2005/0108312 A1 * | 5/2005 | Chen et al. .................. 708/513 |

* cited by examiner

*Primary Examiner*—Eric Coleman
(74) *Attorney, Agent, or Firm*—Ronald O. Neerings; Wade James Brady, III; Frederick J. Telecky, Jr.

(57) ABSTRACT

An apparatus comprising detection logic configured to detect a loop among a set of instructions, the loop comprising one or more instructions of a first type of instruction and a second type of instruction and a co-processor configured to execute the loop detected by the detection logic, the co-processor comprising an instruction queue. The apparatus further comprises fetch logic configured to fetch instructions; decode logic configured to determine instruction type; a processor configured to execute the loop detected by the detection logic, wherein the loop comprises one or more instructions of the first type of instruction, and an execution unit configured to execute the loop detected by the detection logic.

20 Claims, 2 Drawing Sheets

MICROPROCESSOR WITH INDEPENDENT SIMD LOOP BUFFER

BACKGROUND

Processor systems perform various tasks by processing task instructions within pipelines contained in the processor systems. Pipelines generally are responsible for fetching instructions from a storage unit such as a memory or cache, decoding the instructions, executing the instructions, and then writing the results into another storage unit, such as a register. Pipelines generally process multiple instructions at a time. For example, a pipeline may simultaneously execute a first instruction, decode a second instruction and fetch a third instruction from a cache.

General purpose microprocessors are presently being extended to include Single Instruction, Multiple Data (SIMD) and DSP functions, and DSP processors are extended to include controller code. SIMD instructions allow a single instruction to operate at the same time on multiple data items.

As a means of power conservation, instructions comprising a loop may be fetched and transferred to an instruction queue, rather than the instruction cache, as described in U.S. application Ser. No. 11/273,691, filed Nov. 14, 2005, entitled "Loop Detection and Capture in the Instruction Queue," and incorporated herein by reference. If a loop is detected and the number of iterations through the loop are known, or if the starting and ending points in the loop are known, the instruction cache and branch prediction module may be shut down while the instructions for the loop are executed from the instruction queue. When the end of the loop is reached (i.e. the branch instruction does not point back to the beginning of the loop), the instruction cache and branch prediction module may be powered again, and fetching from the instruction cache may resume. When a loop buffer is implemented in the instruction queue, as described in U.S. application Ser. No. 11/273,691, filed Nov. 14, 2005, entitled "Loop Detection and Capture in the Instruction Queue," power is conserved by not fetching instructions from the instruction cache. For a microprocessor with an SIMD engine implemented in the back end of the integer execution pipeline, the instructions are, however, still pipelined through all of the pipeline stages from the instruction queue and the integer execution unit is tied up during the execution of SIMD instructions.

Presently, architectures with resources dedicated to executing SIMD instructions are emerging, and there are no known solutions to increase power efficiency and throughput in such architectures by handling loops and SIMD instructions.

SUMMARY

The problems noted above are solved in large part by an apparatus comprising detection logic configured to detect a loop among a set of instructions, the loop comprising one or more instructions of a first type of instruction and a second type of instruction, and a co-processor configured to execute the loop detected by the detection logic, the co-processor comprising an instruction queue.

Another illustrative embodiment may be a system comprising a pipeline in which a plurality of instructions are processed, detection logic coupled to the pipeline configured to detect a loop in the plurality of instructions, wherein the loop comprises one or more instructions of a first type or a second type, and a co-processor coupled to the pipeline, the co-processor configured to execute the loop detected by the detection logic, wherein the loop comprises one or more instructions of the second type, the co-processor comprising an instruction queue.

Yet another illustrative embodiment may be a method comprising detecting a loop within a set of instructions, determining whether the loop comprises instructions of a first instruction type or a second instruction type, executing the first instruction type in an general execution unit and executing the second instruction type in a co-processor for the second type of instruction.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
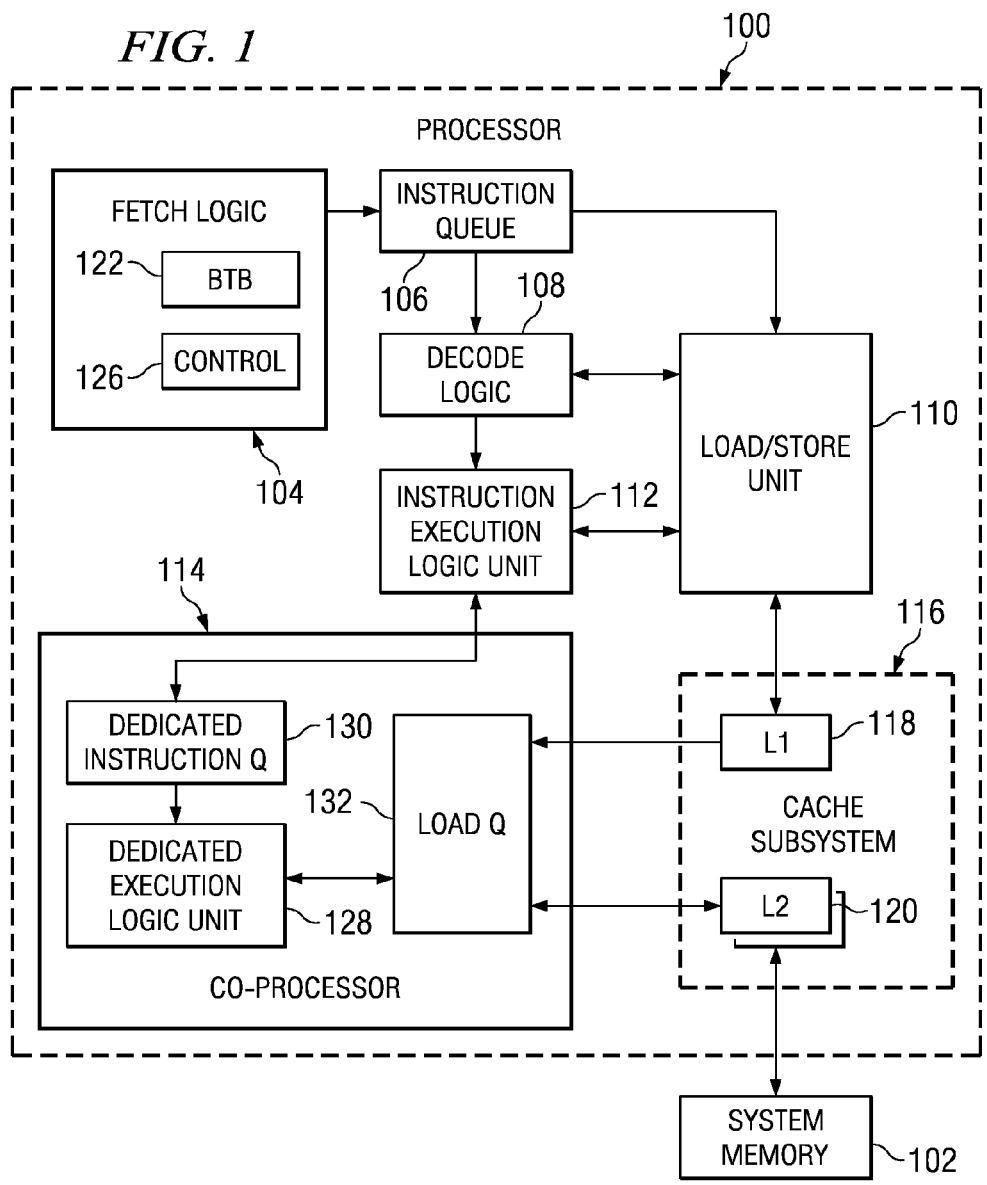
FIG. 1 shows a block diagram of processor, in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system as well as a subsystem within the context of a larger system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A processor system generally stores instructions in an instruction cache prior to processing the instructions. When the processor is ready to process the instructions, the instructions are fetched from the instruction cache and are transferred to a pipeline. The pipeline generally is responsible for decoding and executing the instructions and storing results of the instructions in a suitable storage unit, such as a register or a memory.

As a means of power conservation, instructions comprising a loop may be fetched and transferred to an instruction queue, rather than the instruction cache. If a loop is detected and the number of iterations through the loop are known, or if the starting and ending points in the loop are known, the instruction cache and branch prediction module may be powered down while the instructions for the loop are executed from the instruction queue. When the end of the loop is reached (i.e. the branch instruction does not point back to the beginning of the loop), the instruction cache and branch prediction module may be powered again, and fetching from the instruction cache may resume.

SIMD instructions may be handled in a dedicated SIMD execution unit along the pipeline. Prior to the present disclosure, implementation of a loop buffer at the instruction queue still dissipated significant power because all of the instructions had to be pipelined through all of the pipeline stages of both execution units, and the integer execution unit was tied up during execution of SIMD instructions in the dedicated SIMD execution unit. For a microprocessor with an SIMD engine implemented in the back end of the integer execution pipeline, the instructions are, however, still pipelined through all of the pipeline stages from the instruction queue and the integer execution unit is tied up during the execution of SIMD instructions.

If, however, loops among SIMD instructions are identified, localized in, and executed from a separate instruction queue within the SIMD execution unit according to embodiments of the present disclosure, the integer execution unit and the instruction queue therein may either shut down, saving power, or concurrently execute other instructions, increasing throughput. The present disclosure describes a system and method for executing loops of SIMD instructions from a queue within a dedicated SIMD execution engine, freeing up the integer execution unit for shut down via clock gating or parallel execution of other instructions.

FIG. 1 shows a block diagram of a system that comprises a processor 100 coupled to a system memory 102. The processor 100 comprises fetch logic 104, instruction queue 106, decode logic 108, a load/store unit 110, an instruction execution logic unit 112, a co-processor 114, and a cache subsystem 116 comprising L1 and L2 caches 118 and 120 respectively. The fetch logic 104 comprises a branch target buffer (BTB) 122, and a control logic 126 capable of controlling the BTB.

In general, the fetch logic 104 fetches instructions from, for example, system memory 102, or elsewhere, and provides the fetched instructions to the instruction queue 106. The decode logic 108 examines an operational code ("opcode") in each instruction to determine the type of instruction so that the instruction can be appropriately processed. Specifically, the opcode indicates whether the type of an instruction is SIMD. In general, the instructions may be loads, stores, adds, multiplies, etc. A load instruction causes target data to be retrieved from memory and provided to a register (not specifically shown) in the processor. A store instruction causes data to be written to a specific address in memory. Add instructions cause two operands to be added together and multiplies cause two operands to be multiplied together as is commonly understood. Other kinds of instructions are possible as well such as direct memory accesses (DMAs) and pre-fetches.

The fetch logic 104 performs branch prediction, as known in the art and further disclosed in "Method and System for Branch Prediction," U.S. Pat. No. 6,233,679, which is hereby incorporated by reference in its entirety. During branch prediction, the fetch logic 104 stores historical data that describes the behavior of previously-executed instructions. For example, for a set of instructions having a single branch instruction, the fetch logic stores the address of the branch instruction, as well as the address of the instruction that is executed immediately after the branch instruction, termed the "target address." The instruction that is executed immediately after the branch instruction depends on whether or not the branch in the branch instruction is taken. If, during previous iterations, the branch usually was not taken, then the fetch logic stores the address of the instruction succeeding the branch instruction in the BTB 122.

In some embodiments, the fetch logic 104 may not store the address of such a succeeding instruction, since in these embodiments, the next address used is the next sequential address generated as if there is no branch instruction in the instruction sequence. If during previous iterations, however, the branch usually was taken to, for instance, the last instruction in the instruction set, then the fetch logic 104 stores the address of the last instruction in the instruction set.

A loop may be identified by a "loop instruction," and the branch prediction module may include a bit to identify such an instruction. In the case of a loop, such as the loop comprising one or more instructions, the fetch logic 104 stores various data. More specifically, in an iteration through the instruction set, the technique of the present disclosure may comprise storing in the BTB 122 a pointer corresponding to the address of the instruction at the beginning of the loop. Additionally, during the iteration through the instruction set, the technique comprises storing in the BTB 122 a pointer corresponding to the address of the instruction at the end of the loop. A general technique of detecting a loop and assigning these pointers is disclosed in U.S. application Ser. No. 11/273,691, filed Nov. 14, 2005, entitled "Loop Detection and Capture in the Instruction Queue". Having identified a loop, the technique of the present disclosure further comprises identifying whether the type of instructions in the loop is of a certain type, such that the loop will be executed in a dedicated execution logic unit 128 for that type of instruction. For example, the decode unit 108 determines whether the type of instructions are SIMD and the fetch logic 104 identifies whether the instructions in a loop are SIMD to be executed in a dedicated SIMD execution unit 128. The technique further comprises fetching the instructions for the identified loop, placing them in a dedicated instruction queue 130 for that type of instruction, and executing the loop from there, while shutting down the instruction execution logic unit 112 or simultaneously executing other instructions on the instruction execution logic unit 112. Specifically, the technique may, in various embodiments, comprise fetching the instructions for a loop of SIMD type, placing them in an instruction queue 130 dedicated to SIMD instructions, and executing the loop from there, freeing up the instruction execution logic unit 112 that is not dedicated to SIMD instructions for other activities.

The co-processor 114 comprises at least a dedicated instruction queue 130, a data load queue 132, and an dedicated execution logic unit 128. The co-processor 114 may include other logic (not shown in FIG. 1), such as dedicated decode logic to decode a particular type of instructions. The dedicated instruction queue 130 or dedicated execution logic unit 128 may include dedicated decode logic. The co-processor 114 may include other components and logic as well as desired.

Instructions are provided to either the instruction execution logic unit 112 or the co-processor 114 depending on the "type" of the instruction. In general, instructions of a first type are provided to instruction execution logic unit 112 for further processing, and instructions of a second type are provided to co-processor 114 for further processing. For example, SIMD instructions may be provided to a co-processor 114 dedicated to handling SIMD instructions, while other types of instructions are directed to the instruction execution logic unit 112 for further processing.

The dedicated instruction queue 130 stores instructions received via the instruction execution logic unit 112 pending execution by the dedicated execution logic unit 128. Data retrieved from the cache 116 and/or memory 102 from a load instruction is stored in the load queue 132 pending consumption by the dedicated execution logic unit 128. In some embodiments, the co-processor 114 executes SIMD instructions while the instruction execution logic unit 112 executes non-SIMD instructions. While in one embodiment, the co-processor 114 is intended to execute SIMD instructions, in other embodiments, the co-processor 114 may be dedicated to execution of other types of instructions. In general, load and store instructions are executed by the load/store unit 110. Load data from the cache 116 is provided to the instruction execution logic unit 112 or co-processor 114 depending on the type of load instruction.

In an embodiment, the load queue 132 may handle load/store exclusive of the load/store unit 110. In an embodiment, the SIMD engine is able to load the data for loop operation by itself without the assistance of the instruction execution logic unit 112 and load/store unit 110. In an embodiment, the instruction execution logic unit 112 and load/store unit 110 are responsible for generating the address and loading the data for the SIMD engine.

In an embodiment, the load queue 132 may be used to keep track of the base address, the index, the offset, and the adder in order to generate addresses to the L2 cache. In such an embodiment, the load queue 132 may include a TLB entry to ensure that the address is still within the page, and the load queue 132 also may calculate the address for storing data and insert the address into the SIMD store buffer.

The technique discussed above for detecting a loop and assigning pointers may be used in conjunction with the processor/co-processor architecture described above to handle loops comprising SIMD instructions. With pointers in place to indicate the start and end of the SIMD loop, SIMD instructions for the loop may be fetched and transferred to the dedicated instruction queue 130, where they remain until execution of the loop is complete. While the loop is executing SIMD instructions from the instruction queue 130, the instructions may be executed sequentially. Once the loop has been executed from the dedicated instruction queue 130, the next sequential instruction after the end of the loop will be executed as instructions are fetched from the fetch logic 104 and transferred into pipeline for execution, i.e. the decode unit 108 and instruction execution logic unit 112. While the SIMD loop is being executed from the dedicated instruction queue 130, the instruction execution logic unit 112 may be shut down via clock gating, or may be concurrently executing other instructions, including instructions that sequentially follow the SIMD loop or instructions that are independent of the SIMD loop. Subsequent SIMD instructions may fill the instruction queue 130, and these instructions are executed once execution of the loop is complete.

Figure 2:
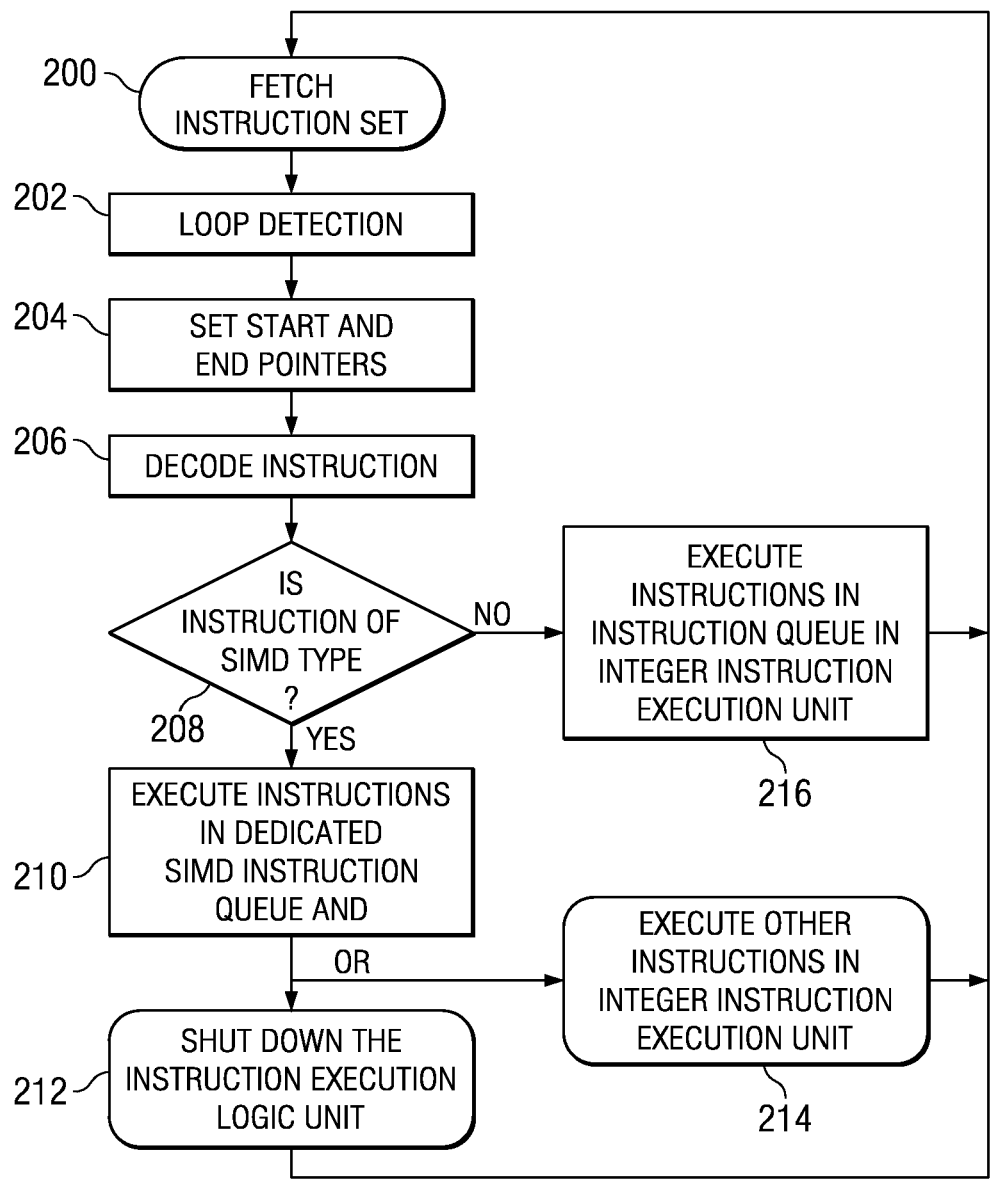
FIG. 2 shows a flow diagram that may be used to implement the techniques described below in context of the processor of FIG. 1, in accordance with an embodiment of the disclosure.

FIG. 2 shows a flow diagram of a method implemented on the processor 100 described above. The method begins with fetching an instruction set 200. Loop detection is performed (block 202). In various embodiments, the act of loop detection may comprise the technique described in 1962-19300, or alternatively, may comprise other known methods for detecting a loop among a set of instructions and/or a loop instruction.

In block 204, a bit is saved, identifying a start pointer, that indicates the address where the loop detected in block 202 begins. Also in block 204, another bit is saved, identifying an end pointer, that indicates the address where to loop detected in block 202 ends. In block 206, the decode logic 108 decodes the instruction to the extent that at least the opcode is examined to determine what is the type of instruction. Another method of loop identification may be described in terms of storing a loop indication and offset, as disclosed in related application Ser. No. 11/273,691, filed Nov. 14, 2005, entitled "Loop Detection and Capture in the Instruction Queue".

A check is done in block 208 to determine if the instruction type is SIMD. If the instruction type is SIMD, in block 210 the instructions for the loop are fetched and placed into the dedicated instruction queue 130, and executed from there. While the loop instructions are executing from the dedicated instruction queue 130, one of two events may occur. In block 212, the instruction execution logic unit 112 may be shut down via clock gating. Alternatively, in block 214, the instruction execution logic unit 112 is freed up for other activities, such as executing the instructions that follow the loop that was detected and is executing in the dedicated instruction queue, or other instructions that are independent from the loop.

In block 214, the instruction execution logic unit 112 may execute the instructions that follow the loop by duplicating the register file (not expressly shown in FIG. 2) and process status register (not shown in FIG. 2). If the SIMD writes back a result to the integer execution pipeline, then the integer execution pipeline may stall in the event that there is a Read-After-Write ("RAW") Dependency. In the case of a Write-After-Write ("WAW") dependency, the integer execution pipeline may duplicate the register to ensure the correct architecture data in case of an exception or interrupt. The architecture may, in an embodiment, be designed with no possible pipeline-stall exceptions in the SIMD engine. Some SIMD exceptions may be stored in a status register and recovered later in time.

If the check in block 208 indicates that the instruction type is not SIMD, the instructions pass through the instruction queue 106, the decode unit 108, and execution unit 112 and executed (block 216). The integer instruction execution is completed in the execution unit 112, while SIMD instructions are passed to the instruction queue 130.

Figure 3:
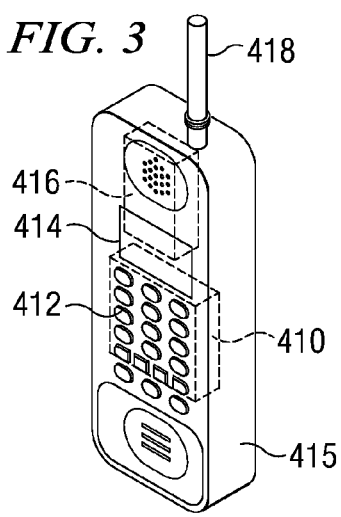
FIG. 3 shows a communication device that may comprise the processor shown in FIG. 1, in accordance with embodiments of the disclosure.

FIG. 3 shows an illustrative embodiment of a system comprising the features described above. The embodiment of FIG. 3 comprises a battery-operated, wireless communication device 415. As shown, the communication device 415 includes an integrated keypad 412 and a display 414. The processor 100 may be included in an electronic package 410 which may be coupled to keypad 412, display 414 and a radio frequency (RF) transceiver 416. The RF circuitry 416 preferably is coupled to an antenna 418 to transmit and/or receive wireless communications. In some embodiments, the communication device 415 comprises a cellular (e.g., mobile) telephone.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
   detection logic configured to detect a loop among a set of instructions, the loop comprising one or more instructions of a first type of instruction and a second type of instruction;
   a co-processor configured to execute the loop detected by the detection logic, the co-processor comprising an instruction queue; and
   an execution unit configured to execute the loop detected by the detection logic;
   wherein the execution unit has the capability to shut down while the co-processor executes the second type of instruction.

2. The apparatus of claim 1, further comprising:
   fetch logic configured to fetch instructions;
   decode logic configured to determine instruction type; and
   a processor configured to execute the loop detected by the detection logic, wherein the loop comprises one or more instructions of the first type of instruction.

3. The apparatus of claim 2, wherein the execution unit is further configured to execute the first type of instruction while the co-processor executes the second type of instruction.

4. The apparatus of claim 2, wherein the co-processor is further configured to execute instructions of Single Instruction, Multiple Data type and the execution unit configured to execute instructions not of Single Instruction Multiple Data type.

5. The apparatus of claim 2, wherein the detection logic is further configured to detect one or more nested loops among a set of instructions.

6. The apparatus of claim 2, further comprising: a load/store unit and a load queue configured to load data for loop operation exclusive of the execution unit and the load/store unit.

7. A system, comprising:
   a pipeline in which a plurality of instructions are processed;
   detection logic coupled to the pipeline configured to detect a loop in the plurality of instructions, wherein the loop comprises one or more instructions of a first type or a second type;
   a co-processor coupled to the pipeline, the co-processor configured to execute the loop detected by the detection logic, wherein the loop comprises one or more instructions of the second type, the co-processor comprising an instruction queue; and
   a general execution unit coupled to the pipeline, the general execution unit configured to execute the loop detected by the detection logic;
   wherein the general execution unit is adapted to shut down while the co-processor executes the second type of instruction.

8. The system of claim 7, further comprising:
   a processor comprising:
      decode logic coupled to the pipeline, the decode logic configured to determine an instruction type of each instruction;
      a fetch unit coupled to the pipeline; the fetch unit configured to place instructions of the first type in the general execution unit and instructions of the second type in the instruction queue.

9. The system of claim 8, wherein the general execution unit is further configured to execute the first type of instruction while the co-processor executes the second type of instruction.

10. The system of claim 8, wherein the co-processor is further configured to execute instructions of Single Instruction, Multiple Data type and the general execution unit is further configured to execute instructions not of Single Instruction Multiple Data type.

11. The system of claim 7, wherein the detection logic is further configured to detect one or more nested loops among the plurality of instructions.

12. The system of claim 7, the system further comprising a load/store unit, and the co-processor further comprising a load queue configured to load data for loop operation exclusive of the general execution unit and the load/store unit.

13. A method, comprising:
   detecting a loop within a set of instructions;
   determining whether the loop comprises instructions of a first instruction type or a second instruction type;
   executing the first instruction type in a general execution unit; and
   executing the second instruction type in a co-processor for the second type of instruction;
   wherein the general execution unit is configured to shut down during execution of code of the second instruction type in the co-processor.

14. The method of claim 13, further comprising setting a start pointer and an end pointer, the loop being further defined by the start and end pointers.

15. The method of claim 13, further comprising executing code of the first instruction type in the general execution unit during execution of code of the second instruction type in the co-processor.

16. The method of claim 13, further comprising executing code following the loop in the general execution unit during execution of code of the second instruction type in the co-processor.

17. The method of claim 13, wherein executing the first instruction type further comprises executing instructions that are not Single Instruction, Multiple Data instructions.

18. The method of claim 13, wherein executing the second instruction type further comprises executing instructions that are Single Instruction, Multiple Data instructions.

19. The method of claim 13, wherein determining the type of an instruction further comprises decoding the opcode.

20. The system of claim 7, wherein the system comprises at least one of a battery-operated device and a wireless device.

* * * * *